US008717675B2

(12) United States Patent
Koh et al.

(10) Patent No.: US 8,717,675 B2
(45) Date of Patent: May 6, 2014

(54) POLARIZING FILM, POLARIZING PLATE, METHOD OF PREPARING THE POLARIZING FILM AND ORGANIC LIGHT-EMITTING APPARATUS INCLUDING THE POLARIZING PLATE

(75) Inventors: Sung-Soo Koh, Yongin (KR); Soon-Ryong Park, Yongin (KR); Chul-Woo Jeong, Yongin (KR); Hee-Seong Jeong, Yongin (KR); Woo-Suk Jung, Yongin (KR); Il-Ryong Cho, Yongin (KR); Tae-Kyu Kim, Yongin (KR); Jae-Yong Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 346 days.

(21) Appl. No.: 13/042,660

(22) Filed: Mar. 8, 2011

(65) Prior Publication Data
US 2011/0279895 A1    Nov. 17, 2011

(30) Foreign Application Priority Data

May 14, 2010    (KR) .......................... 10-2010-0045477

(51) Int. Cl.
*G02B 5/30* (2006.01)
(52) U.S. Cl.
USPC .................................................. 359/487.02
(58) Field of Classification Search
USPC ........ 359/487.01–487.06; 252/585; 264/1.31, 264/1.34; 427/248.1, 299; 977/700, 715, 977/734, 754, 773, 778, 783, 834
See application file for complete search history.

(56) References Cited

U.S. PATENT DOCUMENTS

| 4,166,871 | A | * | 9/1979 | Schuler ..................... 427/163.1 |
| 5,071,234 | A | | 12/1991 | Amano et al. |
| 5,093,041 | A | * | 3/1992 | Check et al. .................. 252/585 |
| 5,738,803 | A | * | 4/1998 | Shepherd et al. .......... 252/299.1 |
| 2004/0180203 | A1 | * | 9/2004 | Yadav et al. .................. 428/402 |
| 2009/0059367 | A1 | * | 3/2009 | O'Malley ...................... 359/492 |
| 2009/0288754 | A1 | * | 11/2009 | Kobayashi et al. ............. 156/64 |
| 2010/0060985 | A1 | | 3/2010 | Kamada et al. |
| 2010/0134726 | A1 | | 6/2010 | Morishima et al. |
| 2010/0157426 | A1 | | 6/2010 | Matsunami et al. |

FOREIGN PATENT DOCUMENTS

| JP | 2000-035512 | 2/2000 |
| JP | 2004-219799 | 8/2004 |
| JP | 2005-202386 | 7/2005 |
| JP | 2005-227312 | 8/2005 |
| KR | 1990-7000898 | 8/1990 |
| KR | 10-0263821 | 5/2000 |
| KR | 10-2002-0022229 | 3/2002 |

OTHER PUBLICATIONS

Mantzaris ("Liquid-phase synthesis of nanoparticles: Particle size distribution dynamics and control," Chem. Eng. Sci. 60, pp. 4749-4770, May 2005).*

* cited by examiner

*Primary Examiner* — James Greece
*Assistant Examiner* — Jie Lei
(74) *Attorney, Agent, or Firm* — Robert E. Bushnell, Esq.

(57) ABSTRACT

A polarizing film having a polyvinyl alcohol-based resin film on which an iodine-first component composite particle is absorbed and oriented. A first component is included in the iodine-first component composite particle prevents iodine having high sublimation characteristics from being sublimated and prevents a molecular structure of the iodine of the iodine-first component composite particle from being destroyed.

13 Claims, 3 Drawing Sheets

POLARIZING FILM, POLARIZING PLATE, METHOD OF PREPARING THE POLARIZING FILM AND ORGANIC LIGHT-EMITTING APPARATUS INCLUDING THE POLARIZING PLATE

CLAIM OF PRIORITY

This application makes reference to, incorporates the same herein, and claims all benefits accruing under 35 U.S.C. §119 from an application earlier filed in the Korean Intellectual Property Office on May 14, 2010 and there duly assigned Serial No. 10-2010-0045477.

BACKGROUND OF THE INVENTION

1. Field of the Invention

Polarizing films, polarizing plates, methods of preparing the polarizing films, and organic light-emitting apparatuses.

2. Description of the Related Art

Generally, polarizing films may be prepared by adsorbing and orienting a dichroic colorant, such as iodine or a dichroic dye, on a polyvinyl alcohol-based resin film. Here, a polarizing film prepared by using iodine as a dichroic colorant is referred to as an iodine-based polarizing film, and a polarizing film prepared by using a dichroic dye as a dichroic colorant is referred to as a dye-based polarizing film.

The iodine-based polarizing film has higher transmittance and higher polarization, i.e., higher contrast, than the dye-based polarizing film.

A polarizing plate including the polarizing film may be included in various electronics, such as organic light-emitting apparatuses.

The above information disclosed in this Related Art section is only for enhancement of understanding of the background of the invention and therefore it may contain information that does not form the prior art that is already known to a person of ordinary skill in the art.

SUMMARY OF THE INVENTION

Aspects of the present invention provide high quality polarizing films.

Aspects of the present invention also provide polarizing plates including the polarizing films, methods of preparing the polarizing films, and organic light-emitting apparatuses including the polarizing plates.

According to an aspect of the present invention, there is provided a polarizing film comprised of a polyvinyl alcohol-based resin film on which an iodine-first component composite is absorbed and oriented.

The iodine-first component composite may be formed of a core formed of iodine and a plurality of first components existing on a surface of the core.

The iodine-first component composite may be formed of a core formed of iodine and a shell covering a surface of the core and including the first component. A thickness of the shell may be from about 10 nm to about 400 nm.

The iodine-first component composite may be formed of a matrix including the first component and a plurality of iodine particles included in the matrix.

The first component may be selected from the group including a nanotube, a dendrimer, a quantum dot, a magnetic nano-particle, gold, cadmium selenide (CdSe), and zinc oxide (ZnO).

A weight ratio of the iodine and the first component in the iodine-first component composite may be from about 1:1 to about 1:1.5.

According to another aspect of the present invention, there is provided a polarizing plate including the polarizing film described above.

A passivation layer may be formed on one or both sides of the polarizing film.

The passivation layer may be an acetate-based film.

According to another aspect of the present invention, there is provided a method of preparing a polarizing film, the method including: uniaxially drawing a polyvinyl alcohol-based resin film; and contacting the polyvinyl alcohol-based resin film with a mixture including an iodine-first component composite.

According to another aspect of the present invention, there is provided a method of preparing a polarizing film, the method including melting and pressing a mixture including a polyvinyl alcohol-based resin, an iodine-first component composite, and a solvent.

The iodine-first component composite may be prepared by a chemical vapor deposition (CVD) method or a liquid phase synthesis method.

The iodine-first component composite may be prepared by a chemical vapor deposition (CVD) method or a liquid phase syntheses method.

According to another aspect of the present invention, there is provided an organic light-emitting apparatus including: an organic light-emitting device; and the polarizing plate described above.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
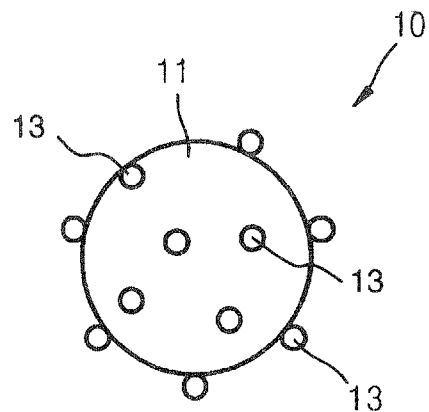
FIGS. 1A and 1B are schematic diagrams respectively illustrating a surface and a cross section of an iodine-first component composite according to an embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

A polarizing film according to an embodiment of the present invention includes a composite of iodine and a first component, hereinafter referred to as an "iodine-first component composite" and a polyvinyl alcohol-based resin film, wherein the iodine-first component composite is adsorbed and oriented on the polyvinyl alcohol-based resin film.

A polyvinyl alcohol-based resin in the polyvinyl alcohol-based resin film is any resin that may be used in a conventional polarizing film.

For example, the polyvinyl alcohol-based resin may be obtained by saponifying a polyacetic acid vinyl-based resin. Examples of the polyacetic acid vinyl-based resin include polyacetic acid vinyl being a homo polymer of acetic acid vinyl, and a copolymer of acetic acid vinyl and a first monomer copolymerizable with the acetic acid vinyl, but are not limited thereto. Examples of the first monomer copolymerizable with the acetic acid vinyl include unsaturated carboxylic acids, olefins, vinyl ethers, and unsaturated sulfonic acids, but are not limited thereto.

A saponification rate of the polyvinyl alcohol-based resin may be from about 85 to about 100 mol %, in detail, from about 98 to about 100 mol %, but is not limited thereto and may be changed according to characteristics of a polarizing film to be realized.

The polyvinyl alcohol-based resin may be denatured. For example, polyvinylformal or polyvinylacetal, which is denatured by aldehydes may be used as the polyvinyl alcohol-based resin.

A degree of polymerization of the polyvinyl alcohol-based resin may be from about 1,000 to about 10,000 and in detail, from about 1,500 to about 5,000, but is not limited thereto and may be changed according to characteristics of a polarizing film to be created.

The first component in the iodine-first component composite prevents iodine having high sublimation characteristics from being sublimated and prevents a molecular structure of the iodine from being destroyed while preparing the polarizing film, for example, while drawing the polyvinyl alcohol-based resin film. Accordingly, the iodine may be uniformly distributed in the polarizing film including the iodine-first component composite, and thus the polarizing film may have high transmittance.

The first component may be selected from among any materials that do not substantially react with the iodine, do not adversely affect polarization of the polarizing film, and prevent sublimation and molecular structure destruction of the iodine.

For example, the first component may be selected from, but is not limited to, the group including a nanotube, a dendrimer, a quantum dot, a magnetic nano particle, gold, cadmium selenide (CdSe), and zinc oxide (ZnO), wherein the gold may have a colloid particle shape.

Figure 1B:
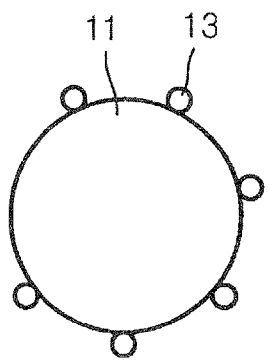

The iodine-first component composite may be formed of a core formed of the iodine and a plurality of the first components existing on the core. FIG. 1A is a schematic diagram illustrating a surface of an iodine-first component composite 10, wherein a plurality of first components 13 exist on a surface of an iodine core 11, and FIG. 1B is a schematic diagram illustrating a cross section of the iodine-first component composite 10 of FIG. 1A. The first components 13 exist on the surface of the iodine core 11, for example, in an island type, thereby preventing sublimation and molecular structure destruction of the iodine core 11. In FIGS. 1A and 1B, the first component 13 has a spherical shape, but the shape of the first component 13 is not limited thereto. An example of the first component 13 that may exist on the surface of the iodine core 11 in FIGS. 1A and 1B includes colloid gold, but is not limited thereto.

Figure 2A:
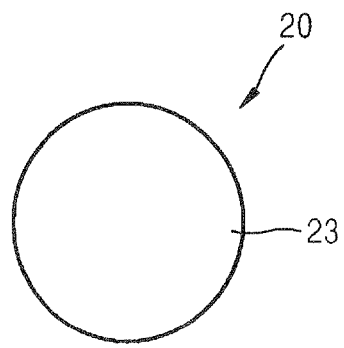
FIGS. 2A and 2B are schematic diagrams respectively illustrating a surface and a cross section of an iodine-first component composite according to another embodiment of the present invention.
Figure 2B:
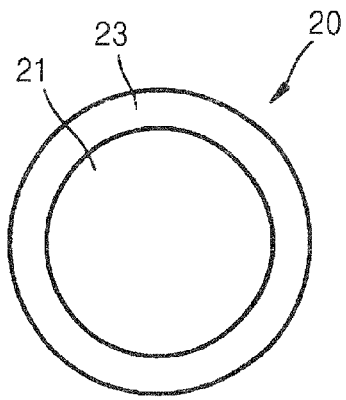

Alternatively, the iodine-first component composite may be formed of a core formed of iodine and a shell covering a surface of the core and formed of the first component. FIG. 2A is a schematic diagram illustrating a surface of an iodine-first component composite 20 formed of a core 21 formed of iodine and a shell 23 covering a surface of the core 21 and formed of the first component, and FIG. 2B is a schematic diagram illustrating a cross section of the iodine-first component composite 20 of FIG. 2B. The shell 23 formed of the first component may prevent the core 21 from being sublimated and prevent a molecular structure of the core 21 from being destroyed.

A thickness of the shell 23 may be from about 10 nm to about 400 nm, for example, from about 10 nm to about 100 nm, but is not limited thereto. When the thickness of the shell 23 is within the above range, the core 21 is effectively prevented from being sublimated.

An example of the first component forming the shell 23 includes zinc oxide (ZnO), but is not limited thereto.

Alternatively, the iodine-first component composite may be formed of a matrix formed of the first component and a plurality of iodine particles included in the matrix.

Figure 3A:
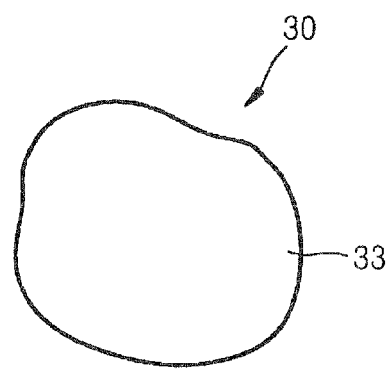
FIGS. 3A and 3B are schematic diagrams respectively illustrating a surface and a cross section of an iodine-first component composite according to another embodiment of the present invention.
Figure 3B:
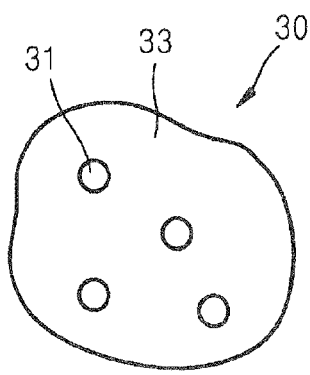

FIG. 3A is a schematic diagram illustrating a surface of an iodine-first component composite 30 including a matrix 33 formed of the first particle and a plurality of iodine particles 31 included in the matrix 33, and FIG. 3B is a schematic diagram illustrating a cross section of the iodine-first component composite 30.

An example of the first component forming the matrix 33 may include gold (Au), but is not limited thereto.

A weight ratio of the iodine and the first component in the iodine-first component composite may be from about 1:1 to 1:1.5, for example, from about 1:1 to about 1:1.3. When the weight ratio of the iodine and the first component is within the above range, the iodine may be effectively prevented from being sublimated, and a molecular structure of the iodine may be effectively prevented from being destroyed.

A thickness of the polarizing film may differ according to characteristics of the polarizing film to be created, and fields to which the polarizing film is applied, and may be from about 5 μm to about 150 μm, in detail from about 10 μm to about 150 μm.

The iodine-first component composite is oriented and adsorbed on the polyvinyl alcohol-based resin, for polarization.

A method of preparing the polarizing film includes uniaxially drawing a polyvinyl alcohol-based resin film, and contacting the polyvinyl alcohol-based resin film with a mixture including an iodine-first component composite. The method may further include processing the polyvinyl alcohol-based resin film after contacting the mixture including the iodine-first component composite, with a boric acid aqueous solution, and washing the polyvinyl alcohol-based resin film after the processing with the boric acid aqueous solution.

The polyvinyl alcohol-based resin film is a film formed of the polyvinyl alcohol-based resin described above. The uniaxially drawing of the polyvinyl alcohol-based resin film may be performed before, simultaneously, or after the contacting of the polyvinyl alcohol-based resin film with the mixture including the iodine-first component composite. When the uniaxially drawing is performed after the contacting, and the method further includes the processing with the boric acid aqueous solution, the uniaxially drawing may be performed before or after the processing with the boric acid aqueous solution. Alternatively, the uniaxially drawing may be performed several times.

During the uniaxially drawing, a heating roll may be used. Also, the uniaxially drawing may be a dry drawing that is performed in the air or a wet drawing performed while the polyvinyl alcohol-based resin film is swollen due to a solvent. The polyvinyl alcohol-based resin film may be drawn by about 4 to 8 times, but is not limited thereto.

The iodine-first component composite included in the mixture may be prepared by using any well known method. For example, a method of preparing the iodine-first component composite may be a chemical vapor deposition (CVD) method or a liquid phase synthesis method, but is not limited thereto.

The mixture may further include potassium iodine, water, or the like, aside from the iodine-first component composite. When the mixture further includes potassium iodine and water, an amount of the potassium iodine may be from about 0.5 to about 20 parts by weight based on 100 parts by weight of water. A temperature of the mixture may be from about 20° C. to about 40° C., and a contacting time of the mixture and the polyvinyl alcohol-based resin film may be from about 20 seconds to about 1,800 seconds, but the temperature of the mixture and the contacting time are not limited thereto.

After contacting the mixture and the polyvinyl alcohol-based resin film, a boric acid process may be further performed. The boric acid process may be performed by impregnating the polyvinyl alcohol-based resin film that contacted the mixture in a boric acid aqueous solution. An amount of the boric acid in the boric acid aqueous solution may be from about 2 to about 15 parts by weight, for example, from about 5 to 12 parts by weight based on 100 parts by weight of water, but is not limited thereto.

The boric acid aqueous solution may further include potassium iodine. When the boric acid aqueous solution further includes potassium iodine, an amount of the potassium iodine may be from about 40 parts by weight or less, for example, 30 parts by weight or less based on 100 parts by weight of water, but is not limited thereto. Also, the amount of the potassium iodine may be from about 0.1 parts by weight or above, for example, 1 part by weight based on 100 parts by weight of water, but is not limited thereto.

The amount of time the polyvinyl alcohol-based resin film is impregnated in the boric acid aqueous solution may be from about 60 to 1,200 seconds, for example, from about 150 to 600 seconds, and in detail, from about 200 to about 400 seconds, but is not limited thereto.

After the boric acid process, the polyvinyl alcohol-based resin film is generally washed. Such a washing process is performed by impregnating the boric acid processed polyvinyl alcohol-based resin film in water. After the washing process, the polyvinyl alcohol-based resin film is dried, thereby obtaining the polarizing film described above.

Meanwhile, the method of preparing the polarizing film is performed by pre-preparing the polyvinyl alcohol-based resin film, and then adsorbing and orienting the iodine-first component composite on the polyvinyl alcohol-based resin film. Alternatively, the polarizing film may be prepared by melting and pressing a mixture including a polyvinyl alcohol-based resin and an iodine-first component composite. Here, the polyvinyl alcohol-based resin film is not pre-prepared, but is formed by mixing the polyvinyl alcohol-based resin and the iodine-first component composite to prepare the mixture, and then melting and pressing the mixture. Accordingly, a continuous process is possible, thereby reducing preparation costs. The mixture may further include a plasticizer for improving flexibility of the polyvinyl alcohol-based resin and a surfactant for improving releasing ability of the polyvinyl alcohol-based resin, as well as the polyvinyl alcohol-based resin and the iodine-first component composite, but additional components included in the mixture are not limited thereto.

The polarizing film may be included in the polarizing plate. Aside from the polarizing film, the polarizing plate may include a passivation layer formed on one or both sides of the polarizing film.

Examples of the passivation layer include a cellulous-based film, such as triacetylcellulous film or a diacetylcellulous film, an acryl-based film, a polyester-based film, a polyarylate-based film, a polyethersulfone-based film, a cyclic polyolefin-based film which includes a cyclic olefin, such as norbornene, as a monomer, and an acetate-based film, but are not limited thereto.

A thickness of the passivation layer may be from about 10 μm to about 200 μm.

Various functional layers, such as a reflection preventing layer, an anti-glare layer, a hard coating layer, and an adhesive layer, may be formed on one side of the polarizing plate, i.e., on a side where the passivation layer is exposed.

The polarizing plate may be included in various electronics, such as a liquid crystal display apparatus and an organic light-emitting apparatus.

For example, the polarizing plate may be included in an organic light-emitting apparatus including an organic light-emitting device.

The organic light-emitting device includes an anode, a cathode, and an organic layer disposed between the anode and the cathode. Light is generated as excitons are formed when holes supplied from the anode and electrons supplied from the cathode recombine in the organic layer, and the excitons change to a ground state. The polarizing plate may be disposed on a surface of the organic light-emitting device contacting an external environment, such as the atmosphere, and on a path of the light emitted from the organic light-emitting device, thereby reducing external light reflectance.

Figure 4:
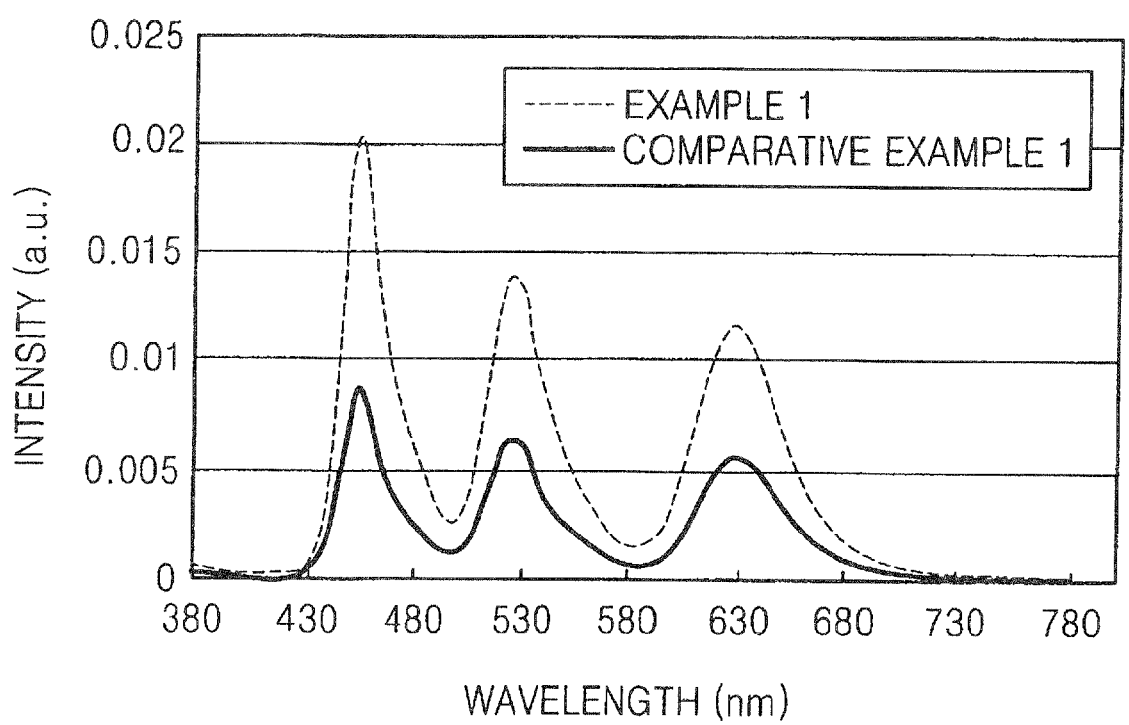
FIG. 4 is a graph showing transmittance spectrums of a polarizing film according to Example 1 and a polarizing film according to Comparative Example 1.

Table 1 below shows transmittances and reflectances of a polarizing film according to Example 1 and a polarizing film according to Comparative Example 1, and FIG. 4 is a graph showing transmittance spectrums of the polarizing film of Example 1 and the polarizing film of Comparative Example 1.

TABLE 1

|  | Transmittance | Reflectance |
| --- | --- | --- |
| Polarizing Film of Example 1 | 48.5% | 4.9% |
| Polarizing Film of Comparative Example 1 | 43.5% | 4.3% |

Here, the polarizing film of Example 1 includes the iodine-first component composite having the structure shown in FIGS. 1A and 1B, wherein the iodine-first component composite is synthesized according to a liquid phase synthesis method and the first component is gold (Au) having a colloid particle shape. The polarizing film of Example 1 was prepared by uniaxially dry-drawing a polyvinyl alcohol film (manufactured by Kuraray Chemicals) 5 times, the polyvinyl alcohol film having a degree of polymerization of about 2,400, a saponification rate of at least 99.9 mol %, and a thickness of 75 μm, impregnating the polyvinyl alcohol film in pure water of 60° C. while maintaining the tension of the polyvinyl alcohol film, and then impregnating the polyvinyl alcohol film in an aqueous solution containing the iodine-first component composite/potassium iodine/water in a weight ratio of 0.15/5/100 at 28° C. for 48 seconds. Then, the polyvinyl alcohol film was washed with pure water of 15° C. for 1.5 seconds, and dried at 50° C., thereby adsorbing and orienting the iodine-first component composite on the polyvinyl alcohol film. Meanwhile the polarizing film of Comparative Example 1 was prepared in the same manner as the preparation of the polarizing film of Example 1, except that iodine particles were used instead of the iodine-first component composite.

In Table 1, the reflectances and the transmittances were obtained by calculating average values of results measured by irradiating a spectrum light having a D65 international standard wavelength (visible ray band of about 400 nm to about 700 nm) on the polarizing films of Example 1 and Comparative Example 1.

Referring to Table 1 and FIG. 4, the polarizing film of Example 1 including the iodine-first component composite has excellent reflectance and excellent transmittance compared to the polarizing film of Comparative Example 1 including only the iodine particles.

The polarizing film may provide high transmittance, and thus an organic light-emitting apparatus including the polarizing film may have high luminance and low power consumption.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polarizing film, comprising
a polyvinyl alcohol-based resin film on which an iodine-first component composite particle is absorbed and oriented,
wherein a first component included in the iodine-first component composite particle prevents iodine having high sublimation characteristics from being sublimated and prevents a molecular structure of the iodine of the iodine-first component composite particle from being destroyed, and
wherein the iodine-first component composite particle is formed of a core formed of iodine and the first component existing on a surface of the core.

2. The polarizing film of claim 1, wherein the first component is a shell covering a surface of the core.

3. The polarizing film of claim 2, wherein a thickness of the shell is from about 10 nm to about 400 nm.

4. The polarizing film of claim 1, wherein the first component is selected from the group consisting of a nanotube, a dendrimer, a quantum dot, a magnetic nano-particle, gold, cadmium selenide (CdSe), and zinc oxide (ZnO).

5. The polarizing film of claim 1, wherein a weight ratio of the iodine in the iodine-first component composite particle and the first component in the iodine-first component composite particle is from about 1:1 to about 1:1.5.

6. A polarizing plate including a polarizing film said polarizing film, comprising:
a polyvinyl alcohol-based resin film on which an iodine-first component composite particle is absorbed and oriented,
wherein a first component included in the iodine-first component composite particle prevents iodine having high sublimation characteristics from being sublimated and prevents a molecular structure of the iodine of the iodine-first component composite particle from being destroyed, and
wherein the iodine-first component composite particle is formed of a core formed of iodine and the first component existing on a surface of the core.

7. The polarizing plate of claim 6, wherein a passivation layer is formed on one or both sides of the polarizing film.

8. The polarizing plate of claim 7, wherein the passivation layer is selected from the group consisting of a cellulous-based film, an acryl-based film, a polyester-based film, a polyarylate-based film, a polyethersulfone-based film, a polyolefin-based film, and a acetate-based film.

9. A method of preparing a polarizing film, comprising:
uniaxially drawing a polyvinyl alcohol-based resin film; and
contacting the polyvinyl alcohol-based resin film with a mixture comprising an iodine-first component composite particle,
wherein a first component included in the iodine-first component composite particle prevents iodine having high sublimation characteristics from being sublimated and prevents a molecular structure of the iodine of the iodine-first component composite particle from being destroyed, and
wherein the iodine-first component composite particle is formed of a core formed of iodine and the first component existing on a surface of the core.

10. The method of claim 9, wherein the iodine-first component composite particle is prepared by a chemical vapor deposition (CVD) method or a liquid phase synthesis method.

11. A method of preparing a polarizing film, comprising:
melting and pressing a mixture comprising a polyvinyl alcohol-based resin, an iodine-first component composite particle, and a solvent,
wherein a first component included in the iodine-first component composite particle prevents iodine having high sublimation characteristics from being sublimated and prevents a molecular structure of the iodine of the iodine-first component composite particle from being destroyed, and
wherein the iodine-first component composite particle is formed of a core formed of iodine and the first component existing on a surface of the core.

12. The method of claim 11, wherein the iodine-first component particle composite is prepared by chemical vapor deposition (CVD) method or a liquid phase syntheses method.

13. An organic light-emitting apparatus comprising:
an organic light-emitting device; and
a polarizing plate, comprising:
a polyvinyl alcohol-based resin film on which an iodine-first component composite particle is absorbed and oriented,
wherein a first component included in the iodine-first component composite particle prevents iodine having high sublimation characteristics from being sublimated and prevents a molecular structure of the iodine of the iodine-first component composite particle from being destroyed, and
wherein the iodine-first component composite particle is formed of a core formed of iodine and the first component existing on a surface of the core.

* * * * *